US012738672B2

(12) United States Patent
Tiwari et al.

(10) Patent No.: US 12,738,672 B2
(45) Date of Patent: Sep. 15, 2026

(54) ULTRA WIDE BAND MINIATURIZED DIPOLE ANTENNA WITH IMPROVED GAIN AND BEAM STABILITY

(71) Applicant: John Mezzalingua Associates, LLC, Liverpool, NY (US)

(72) Inventors: Anoop Tiwari, Liverpool, NY (US); Niranjan Sundararajan, Clay, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 49 days.

(21) Appl. No.: 18/845,945

(22) PCT Filed: Mar. 10, 2023

(86) PCT No.: PCT/US2023/014945
§ 371 (c)(1),
(2) Date: Sep. 11, 2024

(87) PCT Pub. No.: WO2023/172716
PCT Pub. Date: Sep. 14, 2023

(65) Prior Publication Data

US 2025/0192449 A1 Jun. 12, 2025

Related U.S. Application Data

(60) Provisional application No. 63/319,007, filed on Mar. 11, 2022.

(51) Int. Cl.
*H01Q 1/26* (2006.01)
*H01Q 1/24* (2006.01)
(Continued)

(52) U.S. Cl.
CPC ............ *H01Q 21/26* (2013.01); *H01Q 1/246* (2013.01); *H01Q 9/44* (2013.01); *H01Q 15/10* (2013.01)

(58) Field of Classification Search
CPC ........ H01Q 1/246; H01Q 15/10; H01Q 21/26; H01Q 9/44
See application file for complete search history.

(56) References Cited

U.S. PATENT DOCUMENTS 5,999,141 A * 12/1999 Weldon .................... H01Q 1/42 343/703
2010/0302117 A1* 12/2010 Johnson .................. H01Q 1/38 343/822

(Continued)

FOREIGN PATENT DOCUMENTS

CN 208111675 U 11/2018

OTHER PUBLICATIONS

International Search Report and Written Opinion, dated Jul. 13, 2023, received in connection with corresponding International Patent Application No. PCT/US2023/014945.

*Primary Examiner* — Thien M Le
(74) *Attorney, Agent, or Firm* — Meunier Carlin & Curfman LLC

(57) ABSTRACT

A dipole capable of radiating in a wide frequency range of 2.7-4.3 GHz has a folded dipole conductive pattern that is formed on the upper surface of a PCB and a passive conductive pattern that is formed on the lower surface of the PCB providing a wide-band nature to the antenna element. The folded dipole conductive pattern has four base regions, each having a bond pad and four meander traces that couple the adjacent base regions. Each of the four base regions electrically couples to its corresponding balun circuit at one of four solder joints at a corresponding solder joint tab, wherein each of the solder joint tabs mechanically couples with the PCB at one of its four corners. The dipole may also include a passive director that is disposed on an upper surface of the PCB in an open region defined by the folded dipole conductive pattern.

7 Claims, 8 Drawing Sheets

(51) Int. Cl.

| | |
|---|---|
| ***H01Q 9/44*** | (2006.01) |
| ***H01Q 15/10*** | (2006.01) |
| ***H01Q 21/26*** | (2006.01) |

(56) References Cited

U.S. PATENT DOCUMENTS

| | | | | |
|---|---|---|---|---|
| 2014/0240188 | A1* | 8/2014 | Mamo | H01Q 21/26<br>343/798 |
| 2015/0263427 | A1* | 9/2015 | Smith | H01Q 9/26<br>343/803 |
| 2017/0062940 | A1* | 3/2017 | Cao | H01Q 1/246 |
| 2017/0125881 | A1* | 5/2017 | Mangrum | H01Q 9/0421 |
| 2020/0136258 | A1* | 4/2020 | Patton | H01Q 9/285 |
| 2021/0210840 | A1 | 7/2021 | Xu et al. | |
| 2022/0021108 | A1 | 1/2022 | Wu et al. | |
| 2022/0200164 | A1* | 6/2022 | Zhu | H01Q 5/48 |
| 2023/0369744 | A1* | 11/2023 | Caratelli | H01Q 5/50 |

* cited by examiner

ULTRA WIDE BAND MINIATURIZED DIPOLE ANTENNA WITH IMPROVED GAIN AND BEAM STABILITY

CROSS REFERENCE TO RELATED APPLICATIONS

This application is a U.S. National Stage application filed under 35 U.S.C. § 371 of PCT/US2023/014945, filed on Mar. 10, 2023, which claims the benefit of priority to U.S. Provisional Application 63/319,007, filed Mar. 11, 2022, which is incorporated by reference herein in its entirety.

BACKGROUND OF THE INVENTION

Field of the Invention

The present invention relates to wireless communications, and more particularly, to antennas designed to operate in the multiband frequency range from 2.7-4.3 GHz.

Related Art

The advent of 5G NR (New Radio) has led to the use of new frequency bands that are higher than the traditional frequency bands used for cellular communications. Among these new frequency bands is a range of 2.7-4.3 GHz, which encompasses the 150 MHz spectrum used by CBRS (Citizens Broadband Radio Service), which uses frequencies 3550-3700 MHz, and 280 MHz spectrum for C-Band, which uses frequencies 3700-3980 MHz. It is expected that cellular antennas that operate in the range of 2.7-4.3 GHz shall have similar performance and capabilities of existing cellular antennas that operate in lower frequencies. For example, it may be required for the beam generated by an antenna in the 2.7-4.3 GHz range have a well-controlled beam width (e.g., 60 degrees, 45 degrees or 20 degrees) so that multiple antennas can be deployed to cover different sectors that will provide comprehensive coverage with minimal interference. This requires a beam that is consistent in beam width throughout the frequency range used and across all tilt angles in the vertical plane. If not, an antenna may suffer from beam squint, whereby the beam width varies with frequency and a well-controlled beam width at 2.7 GHz may vary significantly at frequencies approaching 4.3 GHz, causing interference and reduced coverage.

Another legacy feature that is required in higher frequency ranges is that of Remote Electrical Tilt. In Remote Electrical Tilt, antenna dipoles in a vertical array are coupled to a phase shifter that provides differential amplitude and progressive phase shift to the signal being fed at each dipole in a column such that the combined beam formed by those dipoles may be steered in the vertical direction. To achieve this, it is necessary to locate the dipoles at a spacing (such as a half-lambda spacing) so that the signal radiated by the dipoles in the vertical column are controlled via a phased array effect. With the advent of beam-forming technology application for increased data rates and user capacity, beam tilting/steering in the horizontal plane has also become necessary. This has driven the antenna element design to mitigate mutual coupling in both vertical and horizontal plane for narrow beam applications.

Significant challenges arise in the design of antennas that meet the above criteria. First, the use of new higher frequency ranges described above are in addition to legacy Low Band (617-690 MHz) and Mid Band (1695-2690 MHz). This leads to the densification of dipoles of multiple bands into a single antenna form factor. This requires that the dipoles covering new frequency ranges, such as 2.7-4.3 GHz, be packed together as close as possible without causing interference.

Accordingly, what is needed is a wideband antenna dipole that can operate in the 2.7-4.3 GHz range without suffering from beam squint, and which can be packed in close proximity with other dipoles in a single antenna array without suffering from interference.

SUMMARY OF THE DISCLOSURE

An aspect of the present disclosure involves a dipole for use in an antenna. The dipole comprises a PCB (Printed Circuit Board) having a folded dipole conductive pattern disposed on an upper side of the PCB and a passive radiator conductive pattern disposed on a lower side of the PCB; and a pair of crossed balun stems mechanically coupled in a cross pattern, each of the balun stems having a matching circuit and two solder joint tabs, wherein each of the two solder joint tabs mechanically engages with an opposite corner of the PCB.

DESCRIPTION OF EXEMPLARY EMBODIMENTS

Figure 1:
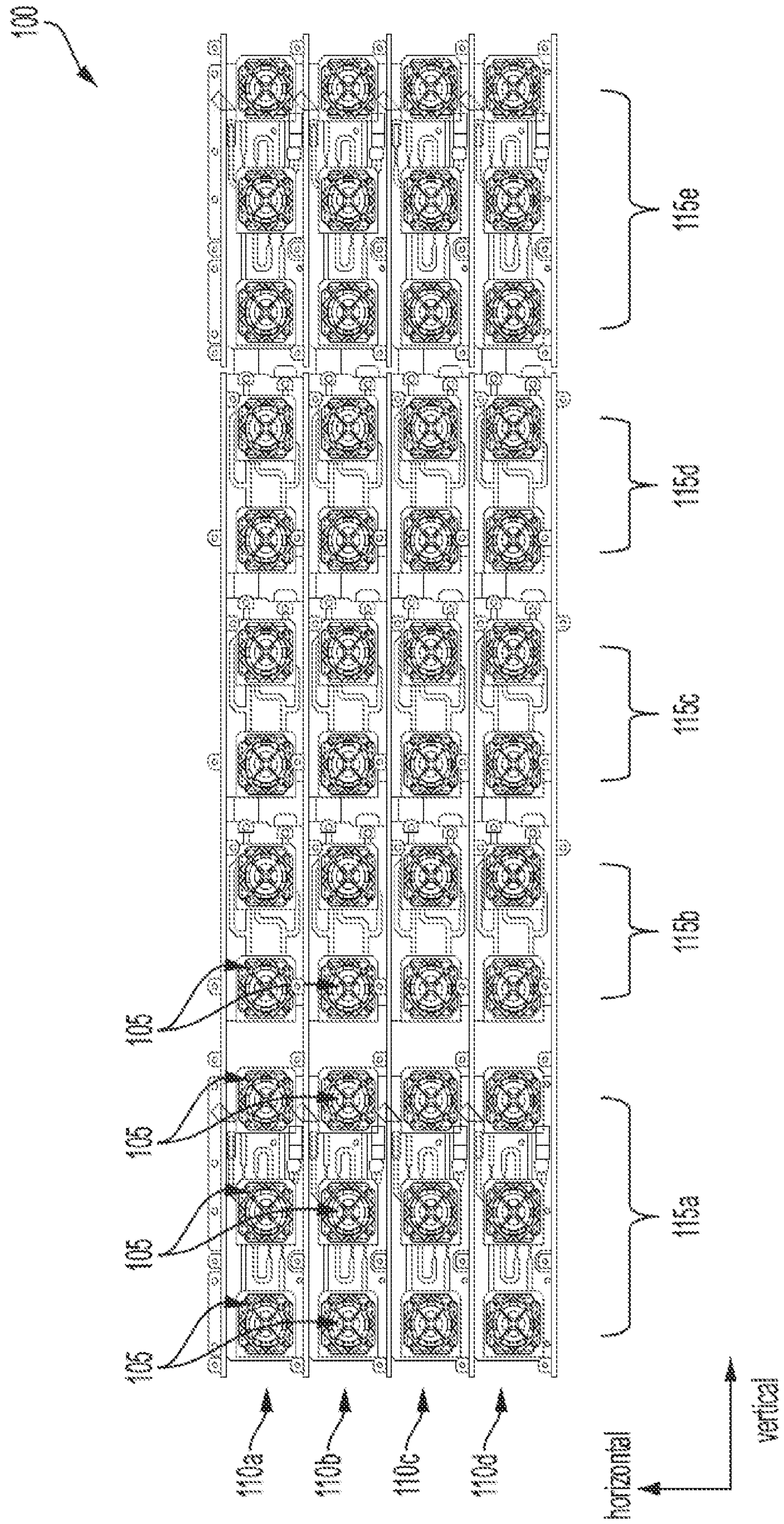
FIG. 1 illustrates an exemplary antenna array face designed to operate in the 2.7-4.3 GHz frequency range in an 8T8R (8 Transmit 8 Receive) configuration.

FIG. 1 illustrates an exemplary array face 100 designed to operate in the 2.7-4.3 GHz range in an 8T8R (8 Transmit 8 Receive) configuration. Array face 100 may be deployed in a multiband antenna that includes arrays of dipoles (not shown) covering other frequency bands like the Low Band and Mid Band described above. Exemplary array face 100 has forty-eight exemplary dipoles 105 that are arranged in four columns 110 of twelve dipoles 105. For the convenience of illustration, array face 100 is rotated such that the vertical axes and horizontal axes are inverted. It will be understood that the four columns 110*a*-110*d* along the vertical axis would be oriented vertically when an antenna having array face 100 is deployed.

Each dipole 105 may support two independent signals at orthogonal polarizations (e.g., +/−45 degrees). Accordingly, each dipole 105 be fed two RF (Radio Frequency) signals, one per polarization.

As is consistent with an 8T8R configuration, all of the dipoles 105 for a given column 110*a-d* are fed a single set of two RF signals that may be adjusted for amplitude and phase via a phase shifter (not shown) to implement Remote Electrical Tilt along the vertical axis. Each of the columns 110*a-d* may have its respective dipoles 105 arranged in clusters 115*a-e*, each of which may be fed a pair of RF signals with a specific phase shift relative to the other clusters of that column to impart Remote Electrical Tilt. For example, column 110*a* has three dipoles 105 in its cluster 115*a*, two in its cluster 110*b*, two in its cluster 115*c*, two in its cluster 115*d*, and three in its cluster 115*e*. The dipoles 105 of column 110*a* are all fed the same pair of RF signals, but the phase shift is different per cluster, as is done in a conventional phase shifter design.

Each of columns 110*a-d* operates independently, which means that the dipoles 105 of column 110*b* may be fed a completely different pair of RF signals to the pair of RF signals fed to the dipoles 105 of column 110*a* and to the pair of RF signals fed to the dipole 105 of column 110*c*. Accordingly, it is important that the dipoles 105 of columns 110*a-d* have sufficient spacing to prevent interference between their respective nearest neighbors along the horizontal axis.

Figure 2:
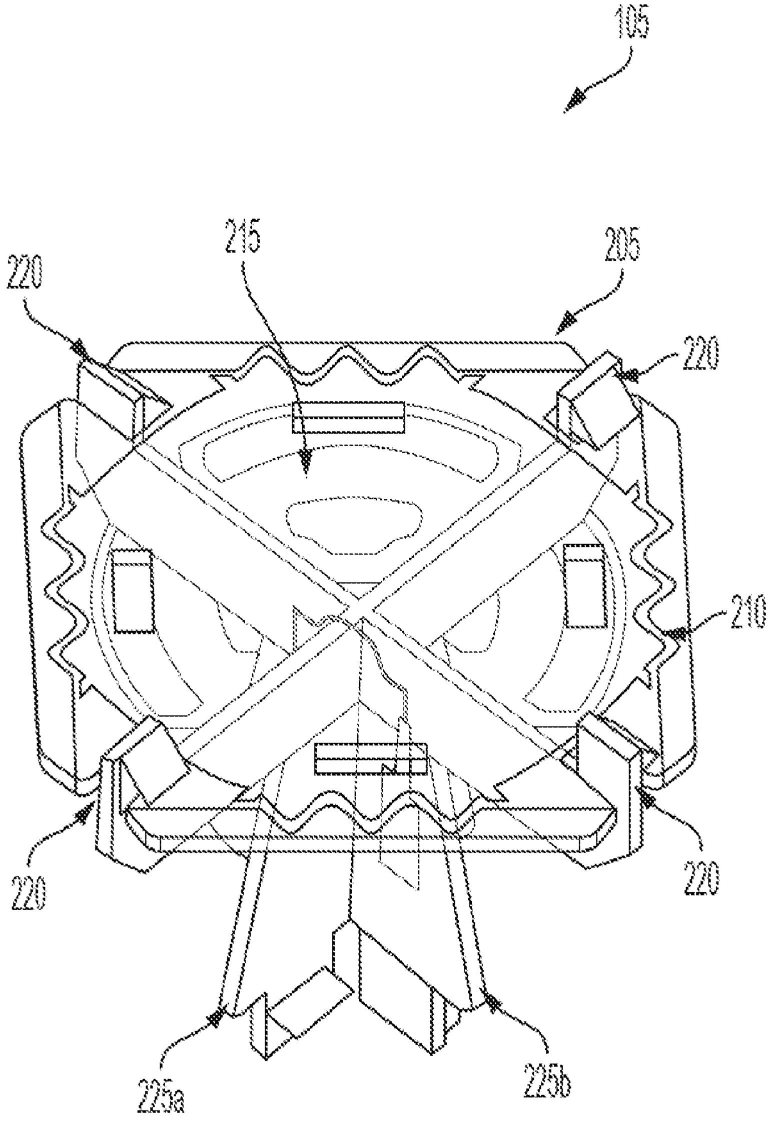
FIG. 2 illustrates an exemplary dipole according to the disclosure.

FIG. 2 illustrates an exemplary dipole 105 according to the disclosure. Dipole 105 has a PCB (Printed Circuit Board) 205, which is illustrated as transparent in the figure. Disposed on an upper side of PCB 205 is a folded dipole radiator pattern 210, which serves as a folded dipole that radiates two independent signals, one per polarization. Disposed on an underside of PCB 205 is a passive radiator pattern 215. PCB 205 is mechanically coupled to balun stems 225*a* and 225*b*, one per independent signal. Disposed on each of balun stems 225*a* and 225*b* is a conductive traces for implementing a matching circuits (not shown), each of which couples an RF signal to the folded dipole radiator pattern 210 on the upper surface of PCB 205. Folded dipole radiator pattern 210 on the upper side of PCB 205 couples to the matching circuits at solder joints 220. Accordingly, the folded dipole implemented by folded dipole radiator pattern 210 is implemented as a ring structure that is connected to its RF signal sources at the edges of PCB 205. There are advantages to this. First, given that dipole 105 is designed to radiate at higher frequencies than conventional cellular antenna dipoles, its dimensions are smaller. Conventional dipoles have their solder joints located toward the center of its PCB, placing them in further proximity. With dipole 105 having a smaller footprint, its solder joints would be placed closer together in a conventional dipole layout. This complicates manufacturing and increases the risk of improper solder joints being formed. This is mitigated by placing the solder joints at the edge of the PCB 205. Further, by placing solder joints 220 further apart, it is easier to solder folded dipole radiator pattern 210 using automated soldering systems.

Figure 3B:
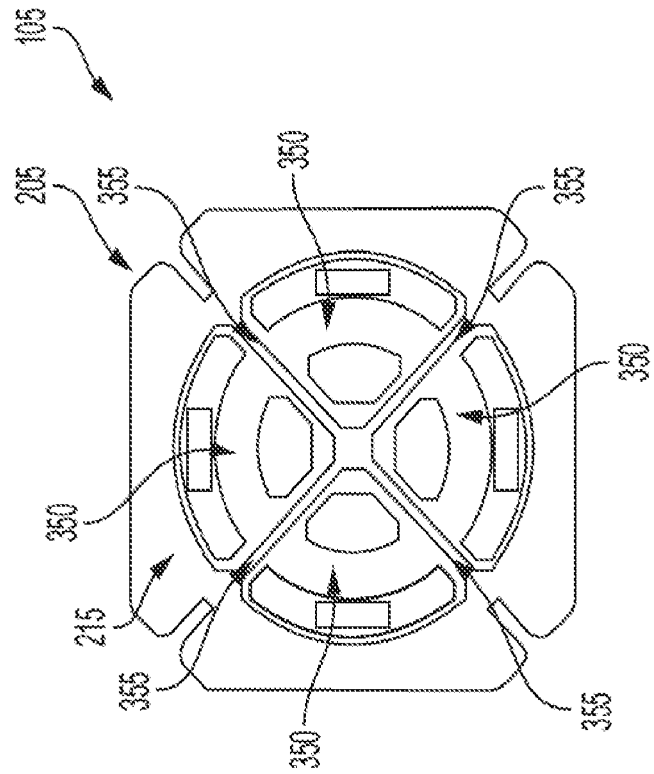
FIG. 3B illustrates a lower side of the PCB of the exemplary dipole of FIG. 2, including its conductive pattern.
Figure 3A:
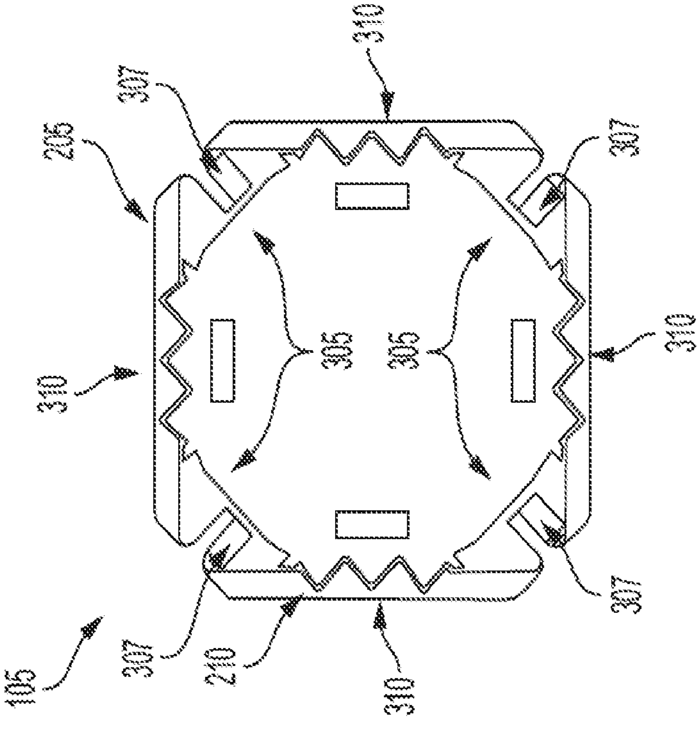
FIG. 3A illustrates an upper side of the PCB (Printed Circuit Board) of the exemplary dipole of FIG. 2, including its conductive pattern.

FIG. 3A illustrates an upper side of PCB 205 of dipole 105, on which is disposed folded dipole radiator pattern 210. Folded dipole radiator pattern 210 has four base regions 305, each having a bond pad 307 for coupling to a corresponding solder joint 220 shown in FIG. 2. Folded dipole radiator pattern 210 also has four meander traces 310, each of which is electrically coupled to two base regions 305. The combination of the four base regions 305 and the meander traces 310 provide a folded dipole configuration that radiates in the intended frequencies of 2.7-4.3 GHz while being of compact size. The meander patterns 310 particularly enable dipole 105 to have a small footprint while being able to radiate effectively at the low end of the frequency range.

FIG. 3B illustrates a lower side of PCB 205 of dipole 105, on which is disposed passive radiator pattern 215. Passive radiator pattern 215 has four isolated regions 350, which are symmetric in four quadrants on PCB 205 and separated by a slot 355. Slot 355 has a width such that the edge of balun stems 225*a/b* (not shown in FIG. 3B) sit within slot 355 and that the edge of each passive radiator pattern isolated region 350 capacitively couples with the conductive trace disposed on balun stems 225*a/b*.

Figure 4B:
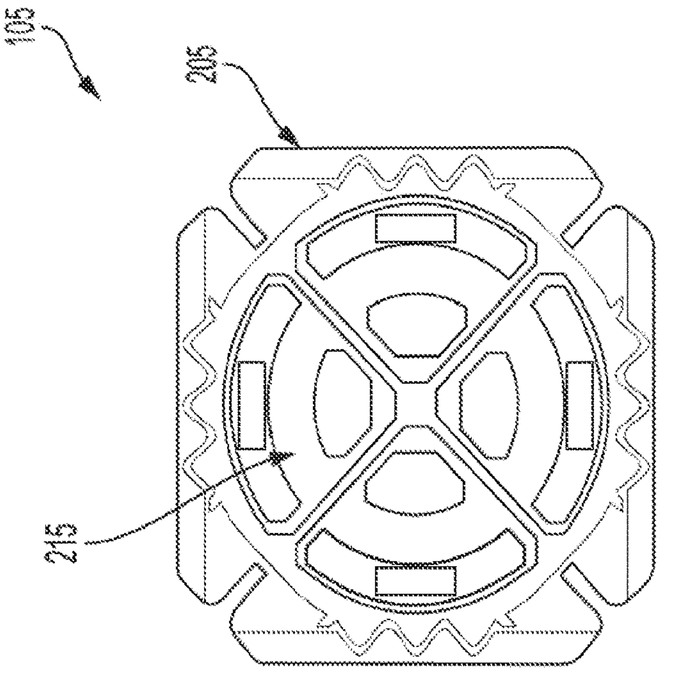
FIG. 4B illustrates the lower side of the PCB of FIG. 3B, including exemplary dimensions.
Figure 4A:
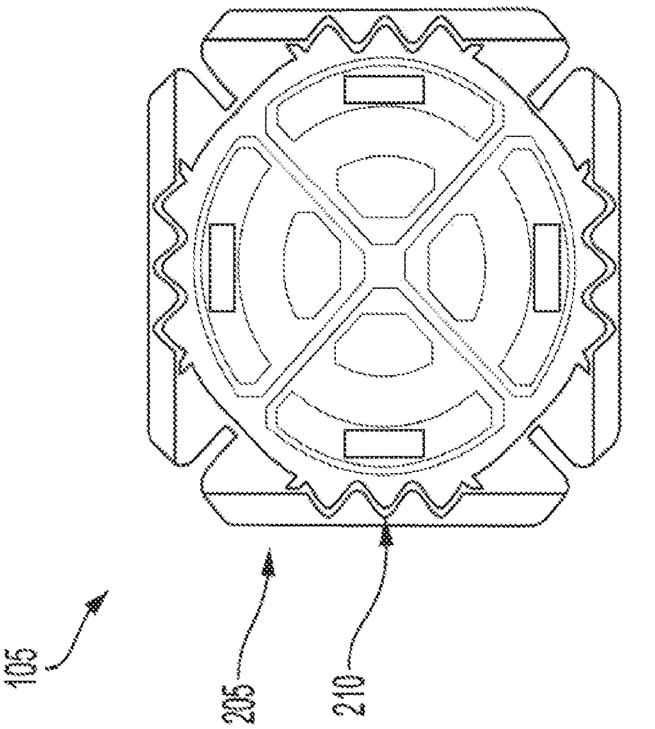
FIG. 4A illustrates the upper side of the PCB of FIG. 3A, including exemplary dimensions.

FIG. 4A and FIG. 4B respectively illustrate the upper surface and lower surface of PCB 205 of dipole 105. FIG. 4A provides exemplary dimensions for folded dipole radiator pattern 210 and passive radiator pattern 215.

Figure 5:
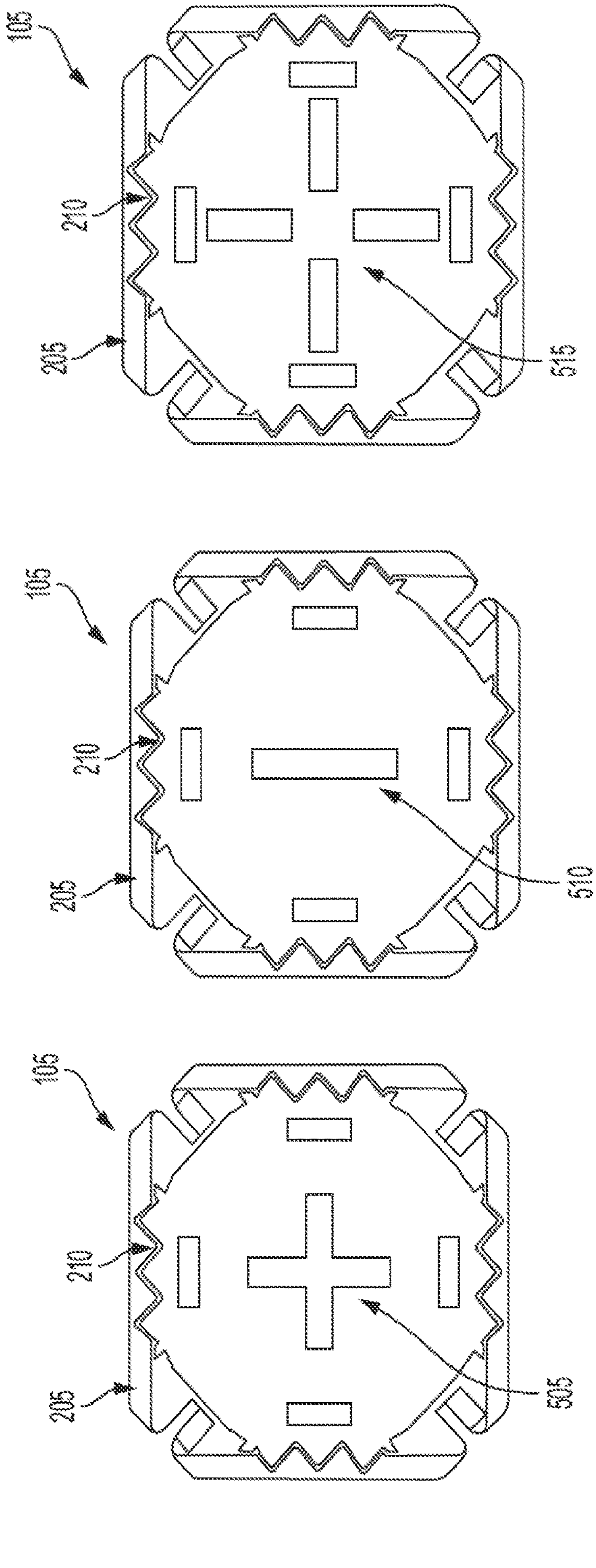
FIG. 5 illustrates three exemplary additional passive directors disposed on an upper side of the PCB according to the disclosure.

FIG. 5 illustrates three examples of the upper side of three dipole 105, showing folded dipole radiator pattern 210. Each of these examples has an exemplary passive director 505, 510, 515, disposed on the upper surface of PCB 205 in the open space defined by folded dipole radiator pattern 210. Passive directors 505/510/515 each serve to focus the beam generated by dipole 105 such that interference is reduced with dipoles 105 of adjacent columns 110. This allows for columns 110*a-d* to be more closely packed together, reducing the size of the 8T8R array face 100. For example, conventional dipoles used in an 8T8R configuration have a minimum spacing of 60 mm (center-to-center). Using disclosed dipole 105 with one of the passive directors 505/510/515, dipoles 105 may be placed as close as 47 mm (center-to-center).

Figure 6:
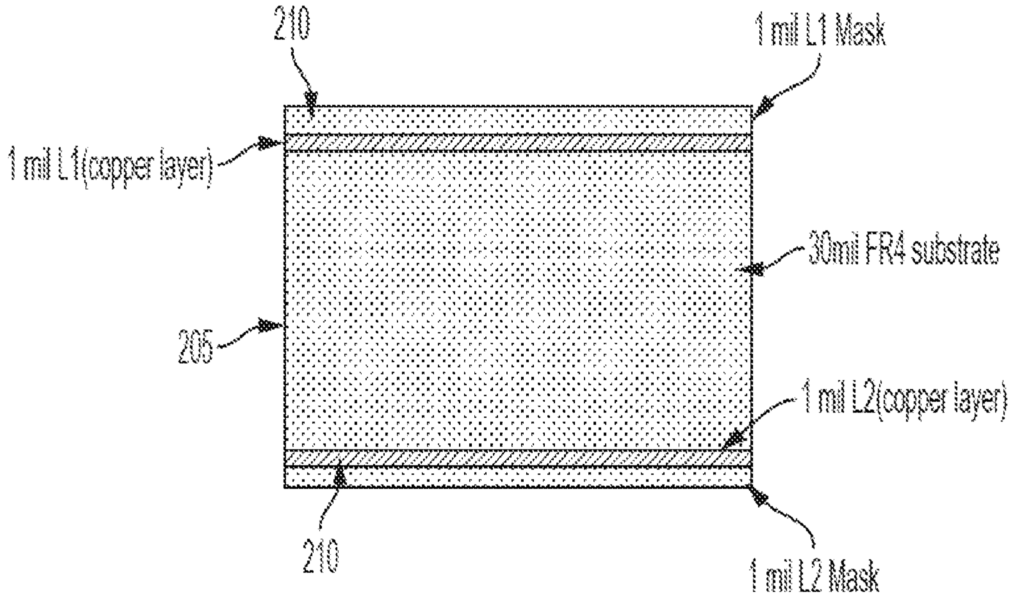
FIG. 6 illustrates a cross section of the PCB of the disclosed dipole, including exemplary materials and thicknesses.

FIG. 6 illustrates an exemplary cross section of dipole 105. This includes an exemplary material and thickness for PCB 205, as well as the materials and thicknesses for folded dipole radiator pattern 210 and passive radiator pattern 215. As illustrated, PCB 205 may be formed of FR4 and have a thickness of 30 mil; folded dipole radiator pattern 210 may be formed of a 1 mil thick layer of copper; and passive radiator pattern 215 may be formed of a 1 mil thick layer of copper. It will be understood that these dimensions are exemplary and that variations are possible and within the scope of the disclosure.

Figure 7:
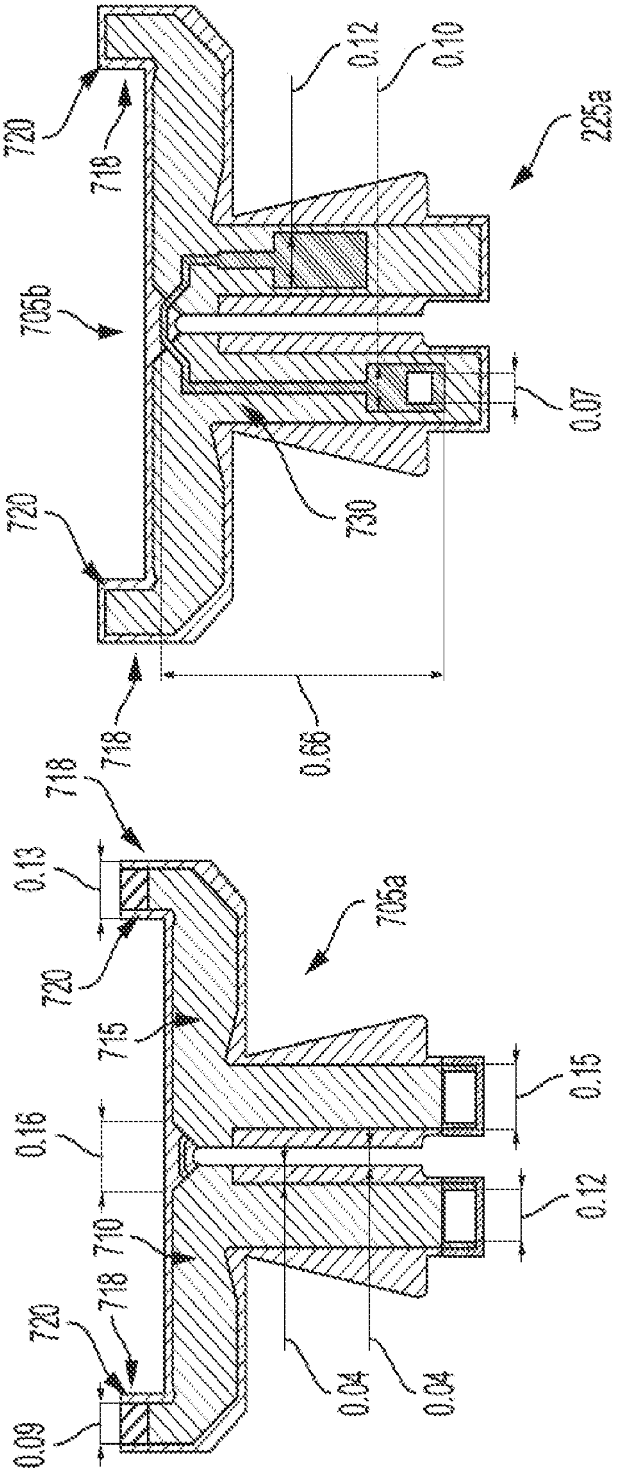
FIG. 7 illustrates both sides of a first balun stem with a first matching circuit according to the disclosure.

FIG. 7 illustrates both sides of a first balun stem 225*a* according to the disclosure, along with exemplary dimensions (in inches). Balun stem 225*a* has a first side 705*a* and a second side 705*b*. Balun stem 225*a* has a matching circuit that includes a balun trace 730 on second side 705*b* and ground traces 710 and 715 on first side 705*a*. The PCB structure of first balun stem 225*a* has two solder joint tabs 718, which mechanically engage PCB 205 at two of its corners. As illustrated, ground trace 710 extends to where it terminates at a solder pad 720 that is disposed on a corresponding solder joint tab 718. Solder pad 720 couples to one of bond pads 307 on a corresponding base region 305 of folded dipole radiator pattern 210 via solder joint 220 (not shown). The same applies to ground trace 715 where it terminates at its corresponding solder pad 720 on its corresponding solder joint tab 718.

Figure 8:
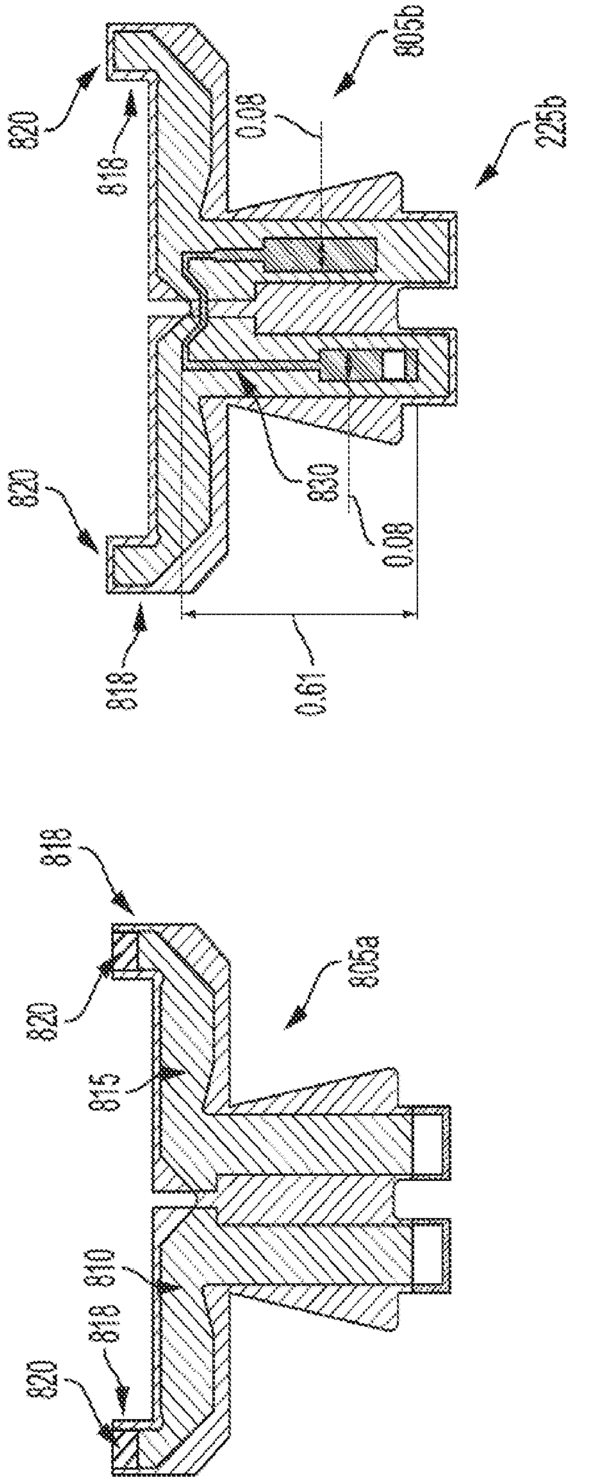
FIG. 8 illustrates both sides of a second balun stem with a second matching circuid according to the disclosure.

FIG. 8. illustrates both sides of a first balun stem 225*b* according to the disclosure, along with exemplary dimensions (in inches). Balun stem 225*b* has a first side 805*a* and a second side 805*b*. Balun stem 225*b* has a matching circuit that includes a balun trace 830 on second side 805*b* and ground traces 810 and 815 on first side 805*a*. The PCB structure of first balun stem 225*b* has two solder joint tabs

818, which mechanically engage PCB 205 at two of its corners. As illustrated, ground trace 810 extends to where it terminates at a solder pad 820 that is disposed on a corresponding solder joint tab 818. Solder pad 820 couples to one of bond pads 307 on a corresponding base region 305 of folded dipole radiator pattern 210 via solder joint 220 (not shown). The same applies to ground trace 815 where it terminates at its corresponding solder pad 820 on its corresponding solder joint tab 818.

What is claimed is:

1. A dipole for use in an antenna, comprising:

a PCB (Printed Circuit Board) having a folded dipole conductive pattern disposed on an upper side of the PCB and a passive radiator conductive pattern disposed on a lower side of the PCB; and a pair of crossed balun stems mechanically coupled in a cross pattern, each of the balun stems having a matching circuit and two solder joint tabs, wherein each of the two solder joint tabs mechanically engages with an opposite corner of the PCB.

2. The dipole of claim 1, wherein the folded dipole conductive pattern comprises:

four base regions, each disposed at a corner of the PCB and having a bond pad; and four meander traces, each electrically coupling two adjacent corner regions.

3. The dipole of claim 1, wherein the passive radiator conductive pattern comprises four quadrants separated by a slot, wherein the slot is configured to enable two adjacent quadrants to capacitively couple with an adjacent matching circuit disposed on a corresponding balun stem.

4. The dipole of claim 1, further comprising a passive director that is disposed on the upper side of the PCB in an open region defined by the folded dipole conductive pattern.

5. The dipole of claim 4, wherein the passive director comprises a single rectangular conductor that runs parallel to two edges of the PCB.

6. The dipole of claim 4, wherein the passive director comprises a cross shape.

7. The dipole of claim 4, wherein the passive director comprises four rectangular conductors, wherein the four rectangular conductors are arranged in two pairs, wherein the first pair of the two pairs are colinear along a first axis that is parallel to two opposite sides of the PCB and the second of the two pairs are colinear along a second axis that is perpendicular to the first axis.

* * * * *